United States Patent [19]

Poppe

[11] 3,923,938

[45] Dec. 2, 1975

[54] PROCESS FOR MANUFACTURING A PILE COVERING

[75] Inventor: Willy Poppe, Sint-Niklaas, Belgium

[73] Assignee: SERPO, naamloze vennootschap, Industriepark, Belgium

[22] Filed: Nov. 8, 1972

[21] Appl. No.: 304,719

[30] Foreign Application Priority Data
Nov. 12, 1971 Belgium .................................. 51447
Nov. 3, 1972 Belgium .................................. 52296

[52] U.S. Cl. ............. 264/45.8; 264/45.3; 264/46.9; 427/32; 427/180; 427/206; 428/91; 428/310; 428/247; 118/621
[51] Int. Cl.² ......................................... B29D 27/00
[58] Field of Search ........... 117/9, 17, 33; 156/62.2, 156/64.2; 161/159, 62; 264/45.1, 45.3, 46.1, 54, 45.8

[56] References Cited
UNITED STATES PATENTS

| | | | |
|---|---|---|---|
| 3,085,896 | 4/1963 | Britt et al. .............................. | 117/33 |
| 3,194,702 | 7/1965 | Geller et al. ........................... | 117/17 |
| 3,445,310 | 5/1969 | Danielson et al. ..................... | 117/17 |
| 3,528,874 | 9/1970 | Spencer ................................. | 117/33 |

*Primary Examiner*—George F. Lesmes
*Assistant Examiner*—Paul J. Thibodeau
*Attorney, Agent, or Firm*—Bacon & Thomas

[57] ABSTRACT

The invention pertains to a method for manufacturing a pile covering, wherein a foam layer, preferably of polyurethane, is continuously produced by spraying a reacting mixture on a supporting layer, pile fibres being projected on said foam layer prior to the hardening thereof, a covering being thus obtained comprising a layer of foam, a skin on the upper face of said layer and pile fibres implanted onto and through said skin.

4 Claims, 3 Drawing Figures

PROCESS FOR MANUFACTURING A PILE COVERING

The present invention concerns a process and an apparatus for manufacturing a pile-covering, such as a carpet, wall upholstery and similar.

Amongst others, it has already been proposed to produce coverings by rendering one face of a foam material, for instance polyurethane foam, tacky by means of heat or to apply a layer of adhesive on said face, and to apply pile fibres on the latter, said fibres being oriented and projected either electrostatically or by other known methods. The thus obtained products can be strengthened by means of a fabric, for instance a jute layer. As the adhesive layer is necessarily of limited thickness, the anchoring of the pile fibres is rather problematic, so that, mainly when used as a carpet, early damage of the pile may be expected.

With the present invention the above mentioned disadvantage is excluded, whilst the cost price of the said covering is considerably reduced as compared to the known methods.

Therefore, a process is proposed which mainly consists in applying a coating of foam-forming reacting mixture onto a temporary or permanent supporting layer and in implanting the pile fibres into the foam coating before it has hardened completely.

Preferably, said layer is constituted of polyurethane components, that is to say of a mixture of polyfunctional isocyanates, active hydrogen containing polymers and chemicals and/or physical blowing agent(s) with foam stabilizers, and, eventually, catalysts and other products.

Advantage is here taken of the fact that a freely foaming polyurethane layer forms a thin, strong skin on its upper face, said skin being of a considerably higher density and integrally bounded to the foam and further having a strong adhesiveness, prior to the hardening of the latter. The porosity of this skin can be adjusted according to known techniques. The depth of inplanting of the pile fibres can be adjusted by choosing the electrostatically or mechanically induced speed of the fibres towards the foam, and also by the time of implanting into the reacting foam.

An apparatus is proposed for the application of this new process which mainly comprises means to move a supporting layer or basic layer; means to bring a layer of a reacting mixture onto one side of this supporting layer; and means to project pile fibres onto the foam layer.

In order to render these and other characteristics of the present invention more apparent, an embodiment is hereafter described in further detail by way of example only with reference to the accompanying schematic drawings, wherein.

Figure 1:
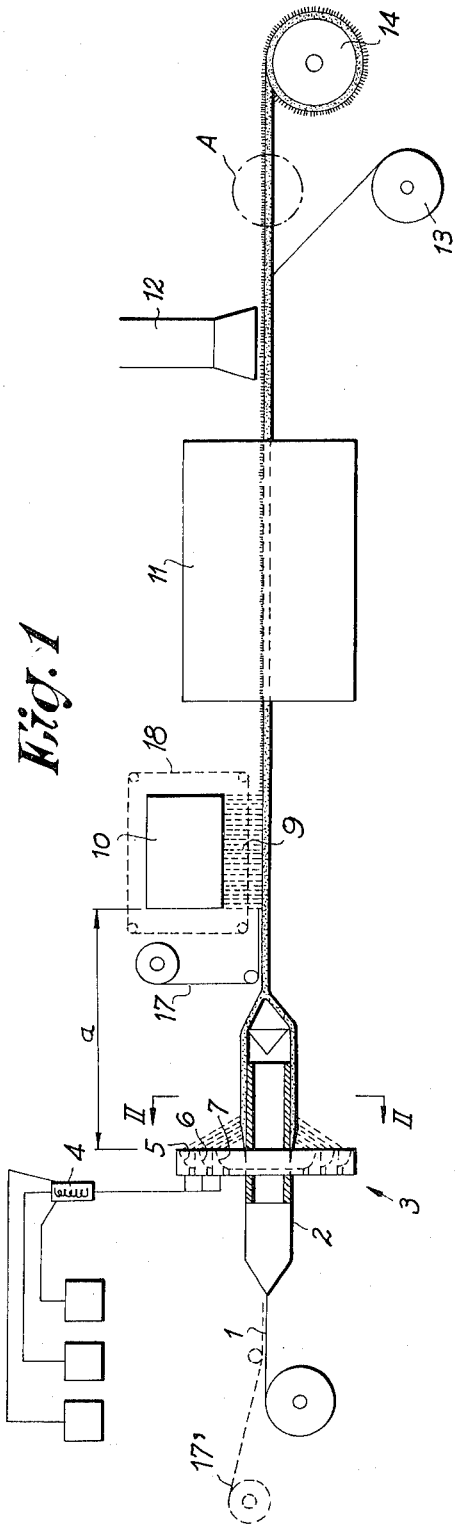
FIG. 1 shows, in side view, an apparatus according to the invention.
Figure 3:
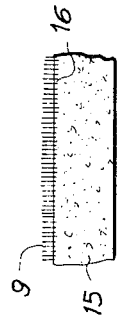
FIG. 3 shows the part on a larger scale, which is indicated at A in FIG. 1.
Figure 2:
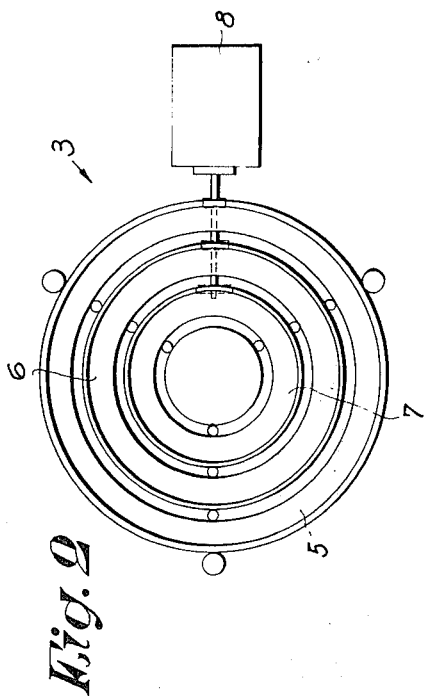
FIG. 2 shows a section alongst line II—II of FIG. 1.

In the illustrated apparatus, a supporting layer e.g. a film or tube of synthetic material 1, is unrolled and guided so as to form a cylinder 2 through a sprayer device 3 to which the reacting mixture is fed from a mixing chamber 4. This sprayer device mainly consists in three concentric profiled rings 5, 6 and 7 driven by a motor 8. On each electrostatically charged ring, foam liquid is fed which is projected or sprayed by attraction of the charged particles onto the grounded supporting layer 2. It can be readily appreciated that by this technique the reaction mixture is electrostatically projected from outside the cylindrical supporting layer and along its full circumference onto said supporting layer.

On leaving the spraying zone, the supporting layer 2 is unfolded to a planar surface by means of an unfolding device. Before the complete hardening of the formed foam, pile fibres 9 are projected onto the foam layer by means of an electrostatic flocking device 10. The thus formed covering is cured out in a curing chamber 11. A suction device 12 provides for the removal of possible loose fibres. The supporting layer 1 and the covering are separated from each other and rolled up as indicated in 13 and 14 respectively.

The thus obtained covering consists in a foam layer 15 with a water- and air-proof upperskin 16 through which the pile fibres 9 are implanted. The implantation depth can be regulated by changing the distance a between the devices 3 and 10 and/or by regulating the intensity of the electrostatic field of the flocking device, and/or by changing the transfer speed of the supporting layer 1. In order to obtain a design or texture effect in the pile, the upper face of the foam layer 15 can be locally deformed, e.g. by rolls, immediately before the implantation of pile fibres. Another means to obtain a texture effect and to increase moreover the tearing strength of the covering consists in the application of a network 17 (knitwork, cotton gauze, net; i.e., an open mesh fabric) onto the building up foam layer, network which is subsequently foamed in, in such a manner that the upper skin 16 presents regularly distributed unevenesses which create the design or texture effect in the pile.

If only an increase of tearing resistance is desired, the network can be placed underneath the foam layer as indicated in 17'.

In order to obtain designs in various desired colors and/or pile dimension, two or more flocking devices 10 can be provided, each of them cooperating with a screen 18 having suitably cut-out portions therein so as to obtain only local desired flockings.

A thermally deformable material may be chosen for the base layer 2, the foam adhering to the latter. In this way a thermally deformable end product is obtained which can ultimately be brought to a desired shape.

It must be pointed out that according to the known procedure as briefly described in the introduction, the foam layers which are used come from a foam block from which they are sliced off. As such, they do not present an upper skin and cannot offer the advantages linked therewith.

What we claim is:

1. A process for manufacturing a pile covering which comprises shaping a support into a cylinder, applying to said cylindrically-shaped support from outside said cylindrical support and onto said cylindrical support along the full circumference of said support, a layer of a foam-forming polyurethane reaction mixture, converting said coated cylindrically shaped supporting layer into a flat surface, implanting pile fibers into the coated foamed layer before said layer has completely hardened, said fibers being implanted by electrostatic flocking, allowing said flocked layer to cure, applying suction thereto to remove any loose fibers therefrom, and separating said foamed fiber flocked layer from said support.

2. The process of claim 1 which further comprises applying an open mesh fabric onto the building up foam layer which is subsequently foamed in.

3. The process of claim 1 which further comprises placing a network under the foamed layer.

4. The process of claim 1 wherein the reacting mixture is electrostatically projected onto the cylindrically shaped supporting layer.

* * * * *